(12) United States Patent
Inoue et al.

(10) Patent No.: US 11,787,516 B2
(45) Date of Patent: Oct. 17, 2023

(54) APPARATUS AND METHOD FOR STEERING CONTROL OF MARINE VESSEL ABLE TO AUTOMATICALLY REDUCE CHINE WALK, AND MARINE VESSEL

(71) Applicant: YAMAHA HATSUDOKI KABUSHIKI KAISHA, Iwata (JP)

(72) Inventors: Hiroshi Inoue, Shizuoka (JP); Satoru Hamada, Shizuoka (JP); Takeshi Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 599 days.

(21) Appl. No.: 17/079,564

(22) Filed: Oct. 26, 2020

(65) Prior Publication Data
US 2021/0188409 A1    Jun. 24, 2021

(30) Foreign Application Priority Data

Dec. 23, 2019 (JP) ................................. 2019-231652

(51) Int. Cl.
| | |
|---|---|
| *B63B 79/10* | (2020.01) |
| *B63B 79/40* | (2020.01) |
| *B63B 39/00* | (2006.01) |
| *B63H 23/34* | (2006.01) |
| *B63H 25/42* | (2006.01) |
| *B63H 1/14* | (2006.01) |
| *G05D 1/02* | (2020.01) |

(52) U.S. Cl.
CPC ............. *B63B 79/40* (2020.01); *B63B 39/00* (2013.01); *B63B 79/10* (2020.01); *B63H 1/14* (2013.01); *B63H 23/34* (2013.01); *B63H 25/42* (2013.01); *G05D 1/0206* (2013.01)

(58) Field of Classification Search
CPC ......... B63B 79/40; B63B 79/10; B63B 39/00; B63H 1/14; B63H 23/34; B63H 25/42; G05D 1/0206
See application file for complete search history.

(56) References Cited

U.S. PATENT DOCUMENTS

2014/0288735 A1   9/2014 Hosoya et al.

FOREIGN PATENT DOCUMENTS

| JP | 2010-162965 A | 7/2010 |
| JP | 2011-005888 A | 1/2011 |
| JP | 2014-180954 A | 9/2014 |

*Primary Examiner* — Mathew Franklin Gordon
(74) *Attorney, Agent, or Firm* — KEATING AND BENNETT, LLP

(57) ABSTRACT

A steering control apparatus for a marine vessel that is able to automatically reduce chine walk includes a processor to obtain behavior information on a hull, including one or more of a behavior relating to a shift of the hull in a roll direction, a shift of the hull in a yaw direction, a shift of the hull in crosswise direction, a steering load, and a helm operation load. When judging that one or more conditions to change a steering mode to a counter steering mode are satisfied, the processor changes the steering mode to the counter steering mode. In the counter steering mode, the processor controls steering of the marine vessel by performing counter steering so as to reduce at least some of one or more of the behaviors of the hull based on the obtained behavior information.

19 Claims, 5 Drawing Sheets

APPARATUS AND METHOD FOR STEERING CONTROL OF MARINE VESSEL ABLE TO AUTOMATICALLY REDUCE CHINE WALK, AND MARINE VESSEL

CROSS REFERENCE TO RELATED APPLICATIONS

This application claims the benefit of priority to Japanese Patent Application No. 2019-231652 filed on Dec. 23, 2019. The entire contents of this application are hereby incorporated herein by reference.

BACKGROUND OF THE INVENTION

1. Field of the Invention

The present invention relates to apparatuses and methods for steering control of a marine vessel that are able to automatically reduce chine walk, and the marine vessels.

2. Description of the Related Art

In some marine vessels, there may be cases where what is called chine walk occurs in which a hull rocks from side to side. Chine walk is caused by a decrease in stability arising from a decrease in the area of contact between the hull and water, and tends to mainly occur during high-speed sailing.

To properly reduce or eliminate chine walk, counter steering needs to be performed in accordance with rocking of the hull, but such counter steering is not easy for ordinary vessel operators. According to a technique disclosed in Japanese Laid-open Patent Publication (Kokai) No. 2014-180954, when the angle of a hull with respect to the water surface becomes greater than a predetermined angle, a motor control means changes the angle of a propulsion device with respect to the hull.

The technique disclosed in Japanese Laid-open Patent Publication (Kokai) No. 2014-180954, avoids an increase in the pitch angle of the hull, but it does not reduce or eliminate chine walk. Moreover, Japanese Laid-open Patent Publication (Kokai) No. 2011-5888 and Japanese Laid-open Patent Publication (Kokai) No. 2010-162965 disclose techniques about counter steering used for heading a marine vessel to a destination. However, neither of the techniques disclosed in Japanese Laid-open Patent Publication (Kokai) No. 2011-5888 and Japanese Laid-open Patent Publication (Kokai) No. 2010-162965 automatically controls counter steering when chine walk has occurred, and thus does not reduce or eliminate chine walk.

SUMMARY OF THE INVENTION

Preferred embodiments of the present invention provide marine vessels, and apparatuses and methods for steering control of the marine vessels, that are each able to automatically reduce chine walk.

According to a preferred embodiment of the present invention, a steering control apparatus for a marine vessel includes a processor configured or programmed to perform the following operations. The processor obtains behavior information on a hull, including one or more of a behavior relating to a shift of the hull in a roll direction, a shift of the hull in a yaw direction, a shift of the hull in a crosswise direction, a steering load, and a helm operation load. The processor judges whether or not one or more conditions to change a steering mode to a counter steering mode in which counter steering is performed are satisfied. The processor changes the steering mode to the counter steering mode upon judging that the one or more conditions are satisfied. In the counter steering mode, the processor controls steering of the marine vessel by performing counter steering so as to reduce at least some of one or more of the behaviors of the hull based on the obtained behavior information.

According to a preferred embodiment of the present invention, a steering control apparatus controls steering of a marine vessel as follows. Behavior information on a hull is obtained for use in the steering control, in which the behavior information includes one or more of a behavior relating to a shift of the hull in a roll direction, a shift of the hull in a yaw direction, a shift of the hull in a crosswise direction, a steering load, and helm operation load. It is judged whether or not one or more conditions to change a steering mode to a counter steering mode, in which counter steering is performed, are satisfied. When judging that the one or more conditions are satisfied, the steering mode is changed to the counter steering mode. In the counter steering mode, steering of the marine vessel is controlled by performing counter steering in the direction to reduce at least some of one or more of the behaviors of the hull based on the obtained behavior information.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
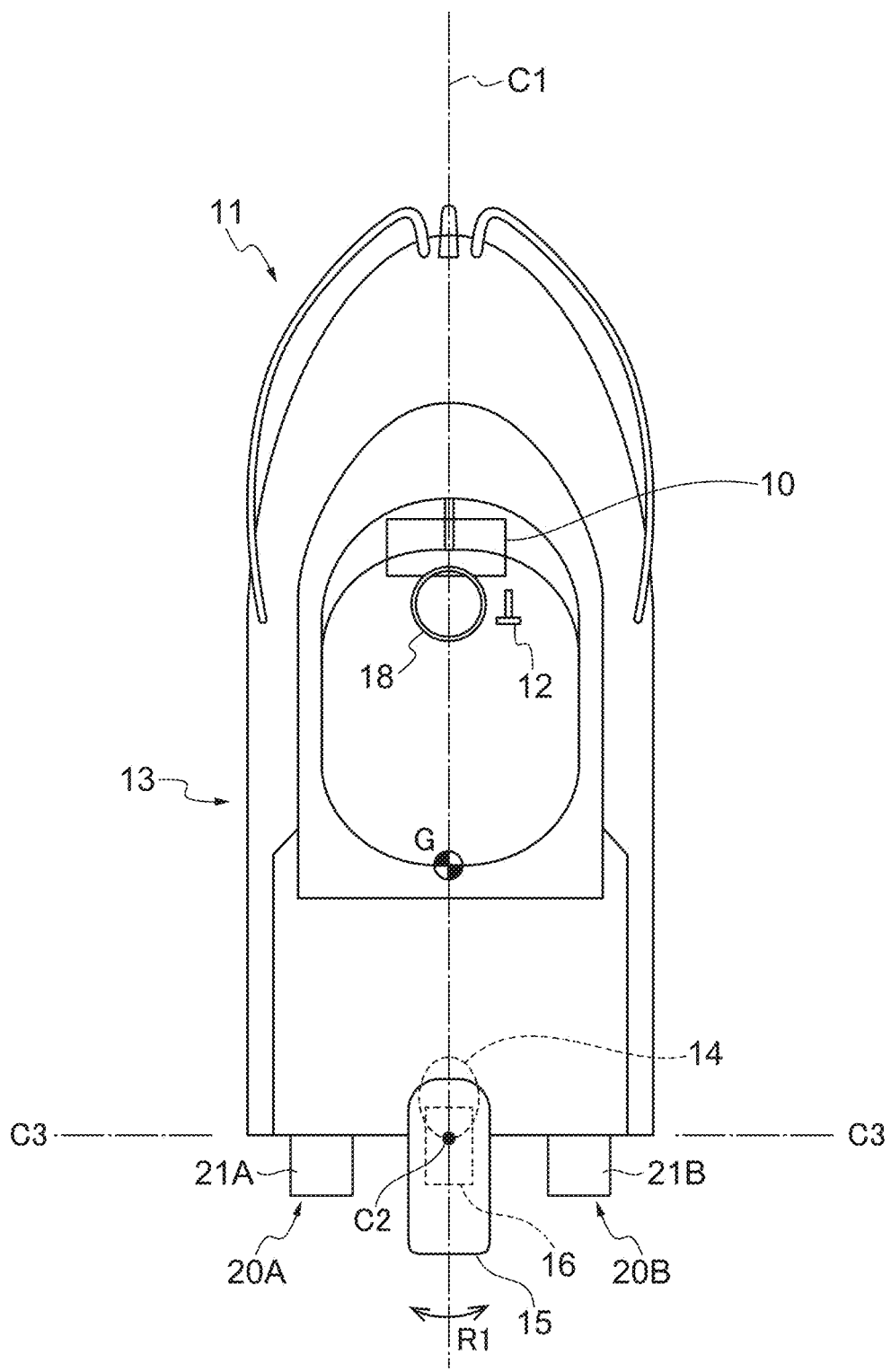
FIG. 1 is a top view of a marine vessel to which a steering control apparatus is provided.

FIG. 1 is a top view of a marine vessel to which a steering control apparatus according to a preferred embodiment of the present invention is provided. The marine vessel 11 includes a hull 13, an outboard motor 15 which defines and functions as a marine propulsion device mounted on the hull 13, and a plurality of trim tab units (for example, a pair of trim tab units 20A, 20B in FIG. 1). A central unit 10, a steering wheel 18, and a throttle lever 12 are provided in the vicinity of a cockpit in the hull 13.

In the following description, a fore-and-aft direction, a crosswise direction, and a vertical direction refer to a fore-and-aft direction, a crosswise direction, and a vertical direction, respectively, of the hull 13. For example, as shown in FIG. 1, a centerline C1 extending in the fore-and-aft direction of the hull 13 passes through the center of gravity G of the marine vessel 11. The fore-and-aft direction is the direction along the centerline C1. Fore or front refers to the direction toward the upper side of the view along the centerline C1. Aft or rear refers to the direction toward the lower side of the view along the centerline C1. The crosswise direction is defined based on a case in which the hull 13 is viewed from the rear. The vertical direction is vertical to the fore-and-aft direction and the crosswise direction.

The outboard motor 15 is mounted on the hull 13. The outboard motor is mounted on the hull 13 via a mounting unit 14. The outboard motor 15 includes an engine 16 which is preferably an internal combustion engine. The outboard motor 15 generates a propulsive force to move the hull 13 by using a propeller 28 (FIG. 2) that is turned by a driving force of the engine 16.

Figure 4:
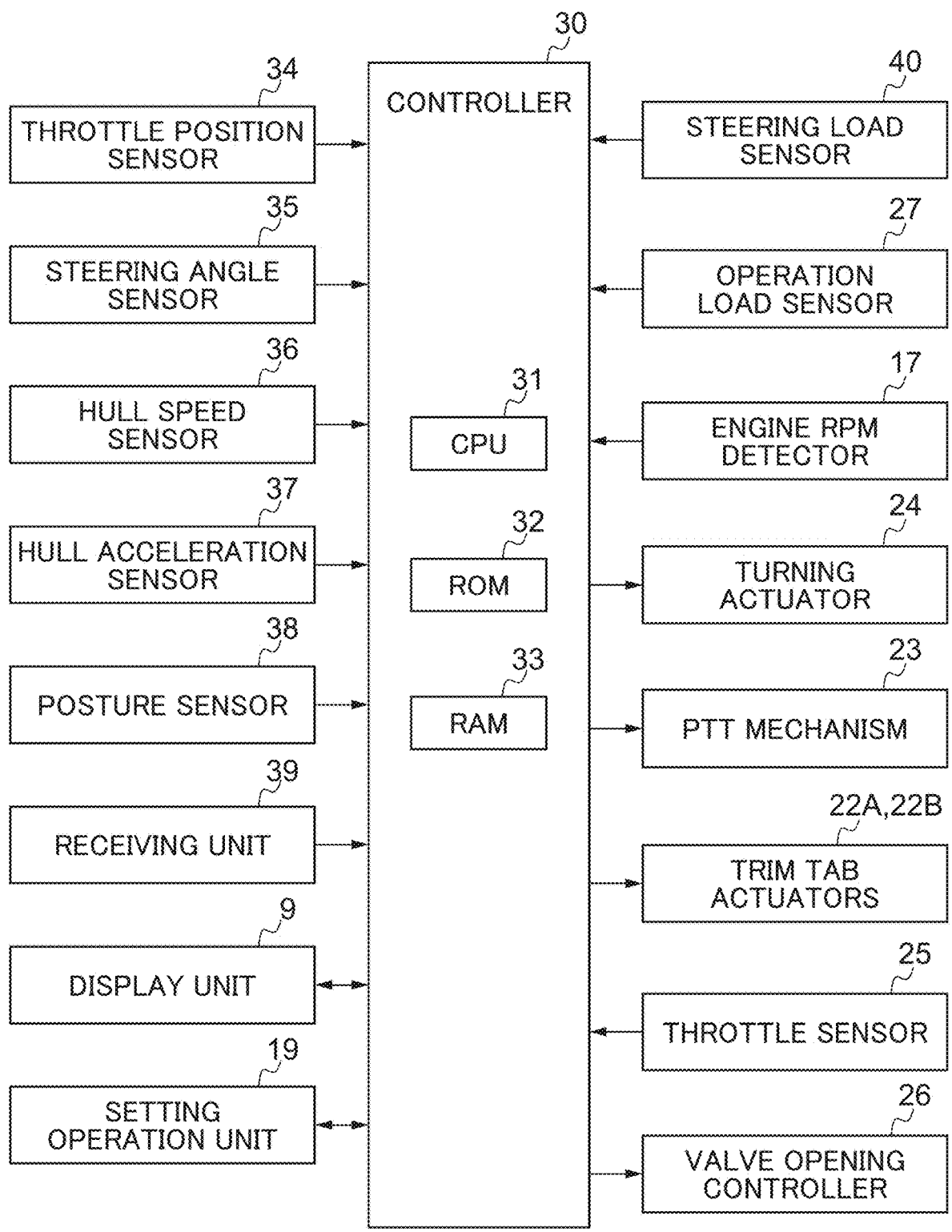
FIG. 4 is a block diagram of a maneuvering system.

The mounting unit 14 includes a swivel bracket, a clamp bracket, a steering shaft, and a tilt shaft (none of which are illustrated). The mounting unit 14 further includes a power trim and tilt mechanism (PTT mechanism) 23 (FIG. 4). The PTT mechanism 23 turns the outboard motor 15 about the tilt shaft. This makes it possible to change an inclination angle (the trim angle or tilt angle) of the outboard motor 15 with respect to the hull 13, and thus a trim adjustment is carried out, and the outboard motor 15 is tilted up and down. Moreover, the outboard motor 15 is able to turn about a turning center C2 (about the steering shaft) with respect to the swivel bracket. Operating the steering wheel 18 causes the outboard motor 15 to turn about the turning center C2 in the crosswise direction (direction R1). Thus, the marine vessel 11 is steered.

The pair of trim tab units 20A and 20B are mounted on the stern on the port side and the starboard side. To distinguish the two trim tab units 20A and 20B from each other, the one located on the port side is referred to as the "trim tab unit 20A", and the one located on the starboard side is referred to as the "trim tab unit 20B". The trim tab units 20A and 20B include a tab 21A (port side posture control tab) and a tab 21B (starboard side posture control tab), respectively.

Figure 2:
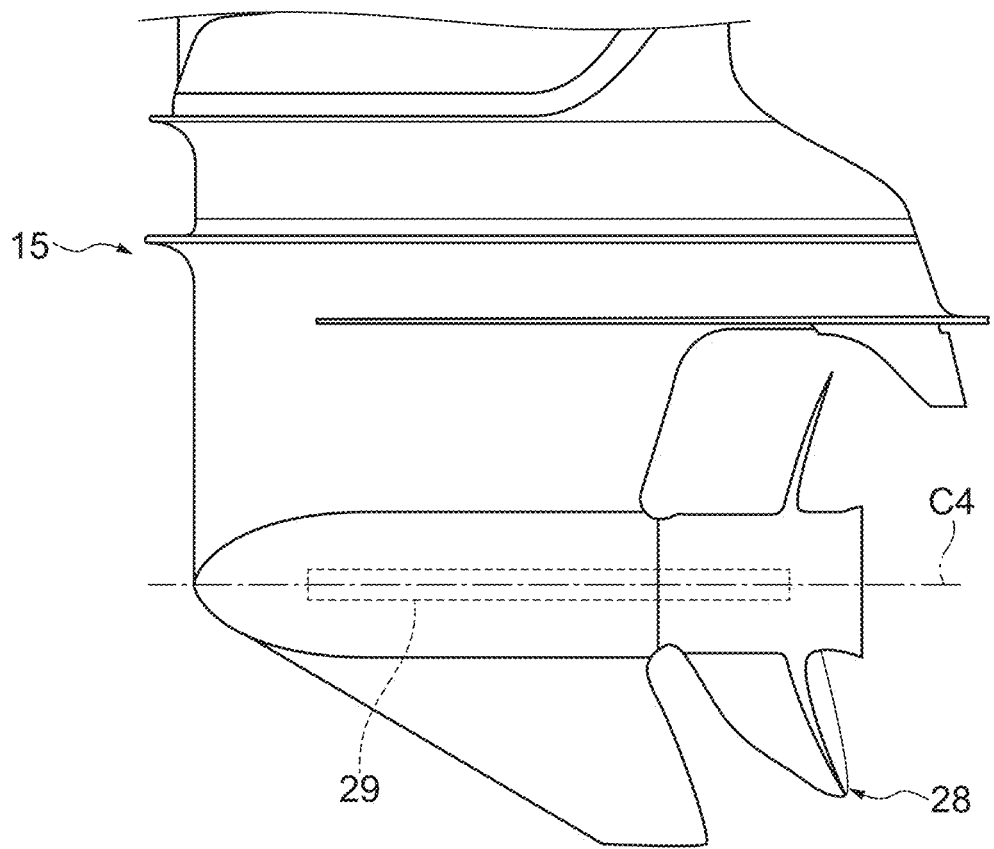
FIG. 2 is a side view of a lower portion of an outboard motor.

FIG. 2 is a side view of a lower portion of the outboard motor 15. The outboard motor 15 transmits a rotational driving force to a propeller shaft 29 via gears, which are not illustrated, causing the propeller 28 to turn about a turning center C4.

Figure 3:
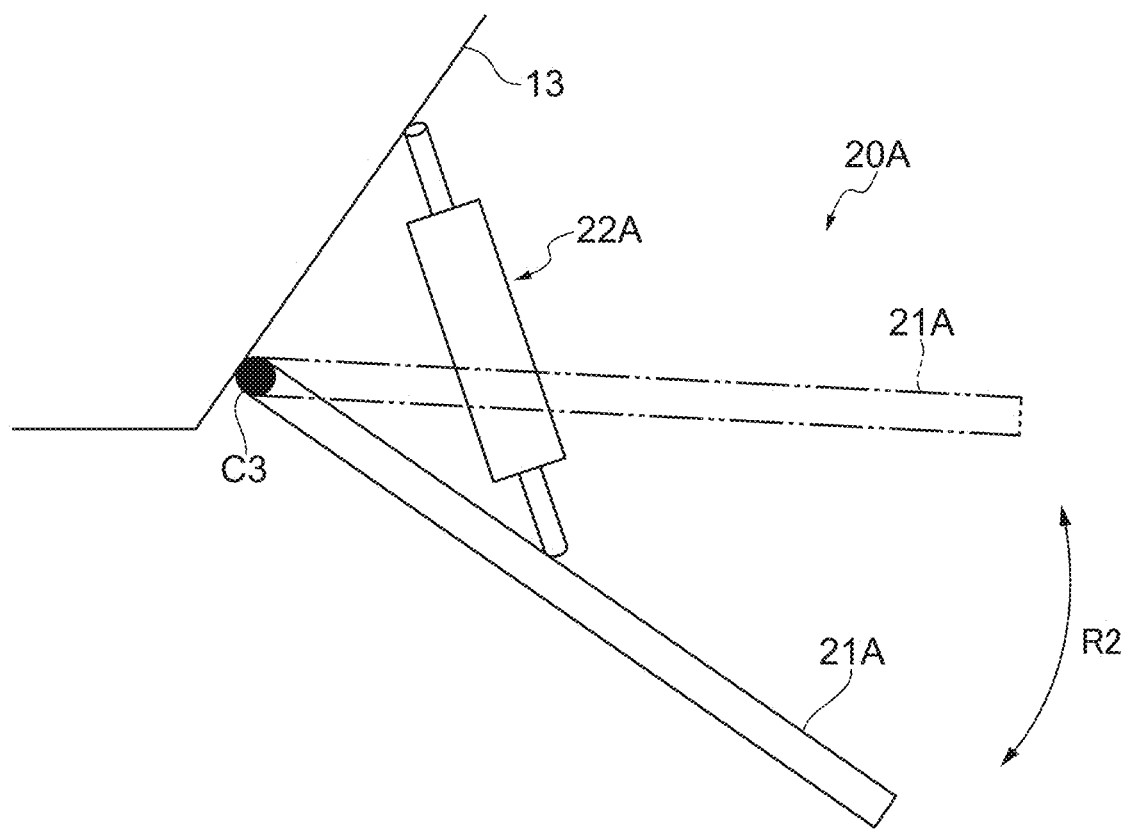
FIG. 3 is a side view of a trim tab unit attached to a hull.

FIG. 3 is a side view of the trim tab unit 20A attached to the hull 13. The trim tab units 20A and 20B have the same construction, and thus a construction of only the trim tab unit 20A will now be described as a representative example. The trim tab unit 20A includes a trim tab actuator 22A and a tab 21A. The tab 21A is attached to the rear of the hull 13 such that it is able to swing about the swing axis C3. For example, the proximal end of the tab 21A is attached to the rear of the hull 13, and the free end of the tab 21A swings up and down (in a swinging direction R2) about the swing axis C3. The tab 21A is an example of a posture control tab that changes its position up and down (in the vertical direction) to control the posture of the hull 13.

The trim tab actuator 22A is disposed between the tab 21A and the hull 13 such that it connects the tab 21A and the hull 13 together. The trim tab actuator 22A actuates the tab 21A to swing it with respect to the hull 13. It should be noted that the tab 21A indicated by a chain double-dashed line in FIG. 3 is at a position where its free end is at the highest level (a position at which the amount of lowering of the tab 21A is 0%), and this position corresponds to a retracted position. The tab 21A indicated by a solid line in FIG. 3 is at a position where its free end is at a lower level than a keel at the bottom of the marine vessel 11. It should be noted that a range in which the tab 21A is able to swing is not limited to the one illustrated in FIG. 3. The swinging direction R2 is defined with reference to the swing axis C3. The swing axis C3 is perpendicular or substantially perpendicular to the centerline C1 and parallel or substantially parallel to, for example, the crosswise direction. It should be noted that the swing axis C3 may extend diagonally so as to cross the turning center C2.

FIG. 4 is a block diagram of a maneuvering system. The maneuvering system includes a steering control apparatus for a marine vessel according to the present preferred embodiment. The marine vessel 11 includes a controller 30, a throttle position sensor 34, a steering angle sensor 35, a hull speed sensor 36, a hull acceleration sensor 37, a posture sensor 38, a receiving unit 39, a display unit 9, and a setting operation unit 19. The marine vessel 11 also includes a steering load sensor 40, an operation load sensor 27, an engine rpm detector 17, a turning actuator 24, the PTT mechanism 23, the trim tab actuators 22A and 22B. The marine vessel 11 further includes a throttle sensor 25 and a valve opening controller 26.

The controller 30, the throttle sensor 25, the valve opening controller 26, the steering angle sensor 35, the hull speed sensor 36, the hull acceleration sensor 37, the posture sensor 38, the receiving unit 39, the display unit 9, the setting operation unit 19, and the operation load sensor 27 are included in the central unit 10 or located in the vicinity of the central unit 10. The turning actuator 24 and the PTT mechanism 23 are provided for the outboard motor 15. The throttle position sensor 34 and the engine rpm detector 17 are provided in the outboard motor 15. The steering load sensor 40 is provided in the turning actuator 24. The trim tab actuators 22A and 22B (port side actuator and starboard side actuators) are included in the trim tab units 20A and 20B, respectively.

The controller 30 includes a CPU 31, a ROM 32, a RAM 33, and a timer which is not illustrated. The ROM 32 stores control programs. The CPU 31 loads the control programs stored in the ROM 32 into the RAM 33 to implement various types of control processes. The RAM 33 provides a work area for the CPU 31 to execute the control programs.

Results of detection by the sensors 25, 27, 34 to 38, and 40 and the engine rpm detector 17 are supplied to the controller 30. The throttle lever 12 is a throttle operator to manually control the throttle opening. The throttle sensor 25 detects the position of the throttle lever 12. The throttle position sensor 34 detects the opening of a throttle valve, which is not illustrated. The valve opening controller 26 controls the opening of the throttle valve. During normal control, the CPU 31 controls the valve opening controller 26 based on the position of the throttle lever 12. It should be noted that the position of the throttle lever 12 and the actual opening of the throttle valve do not always correspond to each other.

The steering angle sensor 35 detects the turning angle of the steering wheel 18. The hull speed sensor 36 and the hull acceleration sensor 37 detect the speed (vessel speed V) and acceleration, respectively, of the marine vessel 11 (the hull 13) while it is traveling. The CPU 31 obtains the vessel speed V from the hull speed senor 36. It should be noted that the CPU 31 may obtain the shift speed of the hull 13 from a GPS signal.

The posture sensor 38 includes, for example, a gyro sensor, a magnetic direction sensor, and so forth. Based on a signal output from the posture sensor 38, the controller 30 calculates a roll angle, a pitch angle, and a yaw angle of the hull 13. It should be noted that the controller 30 may calculate the roll angle and the pitch angle based on a signal output from the hull acceleration sensor 37. The receiving unit 39 includes a GNSS (Global Navigation Satellite Systems) receiver such as a GPS and includes a function of receiving GPS signals and various types of signals as positional information. A signal received by the receiving unit 39 is supplied to the CPU 31. The controller 30 may obtain shift accelerations of the hull 13 in multiple directions including the acceleration of a shift of the hull 13 in the crosswise direction based on a signal output from the hull acceleration sensor 37. It should be noted that the shift accelerations of the hull 13 may also be obtained from a GPS signal received by the receiving unit 39.

The steering load sensor 40 detects a steering load that is applied onto the turning actuator 24 which is an element of a steering system. The steering load arises from a force which the outboard motor 15 has received from the water. The operation load sensor 27 detects a helm operation load applied onto the steering wheel 18 that is being operated. The helm operation load corresponds to a force which a vessel operator who is operating the steering wheel 18 feels via the steering wheel 18.

The engine rpm detector 17 detects the number of revolutions of the engine 16 per unit time (hereafter referred to as "the engine rpm N"). The display unit 9 displays various types of information. The setting operation unit 19 includes an operator that a vessel operator uses to perform operations relating to maneuvering, a PTT operating switch, a setting operator that a vessel operator uses to make various settings, and an input operator that a vessel operator uses to input various types of instructions (none of which are illustrated).

The turning actuator 24 turns the outboard motor 15 about the turning center C2 with respect to the hull 13. Turning the outboard motor 15 about the turning center C2 changes the orientation of the turning center C4 of the propeller shaft 29 around the turning center C2. As a result, the turning actuator 24 changes a direction in which a propulsive force acts with respect to the centerline C1 of the hull 13. The PTT mechanism 23 tilts the outboard motor 15 with respect to the clamp bracket by turning the outboard motor 15 about the tilt shaft. The PTT mechanism 23 is operated in response to, for example, operation of the PTT operating switch. As a result, the PTT mechanism 23 changes the inclination angle of the outboard motor 15 with respect to the hull 13.

The trim tab actuators 22A and 22B are controlled by the controller 30, more specifically, by a processor in the CPU 31 within the controller 30. For example, the trim tab actuators 22A and 22B operate in response to the controller 30 outputting control signals to them. In response to the operation of one of the trim tab actuators 22A and 22B, a corresponding tab swings. It should be noted that actuators used for the PTT mechanism 23 and the trim tab actuators 22A and 22B may be either hydraulic or electric.

It should be noted that the controller 30 may obtain results of detection by the engine rpm detector 17 via a remote control ECU, which is not illustrated. The controller 30 may also use an outboard motor ECU (not illustrated) provided in the outboard motor 15, to control the engine 16.

A signal output from the posture sensor 38 is also used for detection of a turning state of the hull 13. The signal output from the posture sensor 38 includes a yaw rate (yaw rotational angular velocity) which is an angular velocity of rotation around a yaw axis. Based on the yaw rate output from the posture sensor 38, the CPU 31 judges the direction that the hull moves in, in other words, judges whether or not the hull 13 moves straight. When the yaw rate is equal to or smaller than a predetermined value, the CPU 31 judges that the hull 13 moves straight, and when the yaw rate is greater than the predetermined value, the CPU 31 judges that the hull 13 is turning. It should be noted that based on time-series data on the yaw angle obtained from the magnetic direction sensor of the posture sensor 38, the CPU 31 may judge whether or not the direction that the hull 13 moves in has changed.

When the throttle opening of the engine 16 of the outboard motor 15 is increased from a stopped state of the hull 13, and the speed (vessel speed V) of the hull 13 reaches a high speed, the hull 13 shifts from a hump state (non-planing state) into a planing state in the end. If the ship speed V further increases, chine walk may occur. A vessel speed at which chine walk occurs (hereafter referred to as the predetermined speed V1) is well known although it varies with vessels. The predetermined speed V1 is determined in advance based on a lower limit to the vessel speed at which it is assumed that chine walk occurs (for example, 50 miles/h). The predetermined speed V1 is greater than a speed at which the hull 13 shifts from a non-planing state to the planing state (i.e., a speed at which planing starts). Information indicating the predetermined speed V1 is stored in the ROM 32.

In the present preferred embodiment, the CPU 31 estimates occurrence of chine walk, and when it is estimated that chine walk has occurred, the CPU 31 changes a steering mode to a counter steering mode, and performs counter steering in the counter steering mode so as to automatically reduce chine walk. Details of the counter steering mode will be described with reference to FIG. 5.

Figure 5:
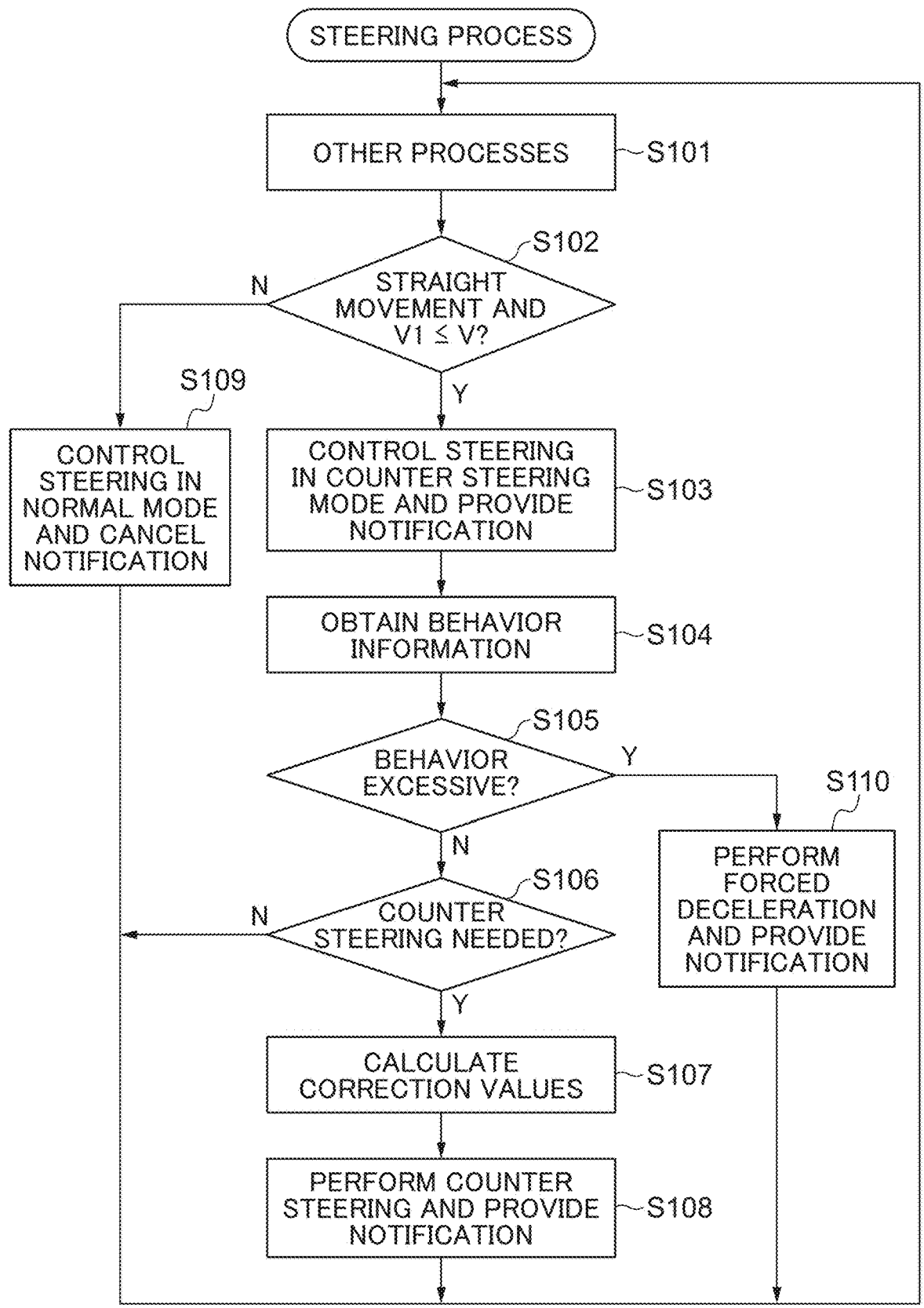
FIG. 5 is a flowchart of a steering process.

FIG. 5 is a flowchart of a steering process. This process is implemented by the CPU 31 loading a control program stored in the ROM 32 into the RAM 33 and executing the same. This process starts when, for example, the maneuvering system is activated. In the processes illustrated in FIG. 5, the CPU 31 defines and functions as an obtaining unit, a judgment unit, and a control unit of the steering control apparatus.

In step S101, the CPU 31 carries out "other processes". As the other processes, processes are carried out according to, for example, settings made and operations performed with the setting operation unit 19. As an example of the other processes, a process that ends this flowchart is carried out in response to an instruction to stop the maneuvering system. In step S102, the CPU 31 judges whether or not one or more conditions (mode changing conditions) to change the steering mode to the counter steering mode have been satisfied. The mode changing conditions are satisfied when the direction that the hull 13 moves in is straight, and the vessel speed V is equal to or greater than the predetermined speed V1 (straight movement and V1≤V).

Here, the judgement whether or not the direction that the hull 13 moves in is straight is made from the yaw rate as discussed above. It should be noted that the judgement whether or not the mode changing conditions are satisfied may be made only from the relationship between the vessel speed V and the predetermined speed V1 without making the judgement whether or not the direction that the hull 13 moves in is straight.

As a result of the judgment in the step S102, when it is judged that the mode changing conditions are not satisfied, the process proceeds to step S109 and the CPU 31 in turn sets the steering mode to the normal mode and controls steering of the marine vessel 11. In a case in which the previous steering mode was the counter steering mode, the CPU 31 changes the steering mode to the normal mode. It should be noted that in a case in which as of the judgment in the step S102, the steering mode was the counter steering mode, and the CPU 31 has provided notification that the steering mode was the counter steering mode, the CPU 31 cancels this notification in the step S109. It should be noted that the normal mode in the step S109 is a manual steering mode. The steering control apparatus may be configured such that an automatic steering mode is set in accordance with a user's instruction. In the automatic steering mode, the CPU 31, for example, creates a planned sea route from the current location to a destination and controls steering of the marine vessel 11 so as to head for the destination by the planned sea route. After the CPU 31 completes the step S109, the process returns to the step S101.

As a result of the judgment in the step S102, when it is judged that the mode changing conditions are satisfied, the process proceeds to step S103, and the CPU 31 in turn controls steering of the marine vessel 11 in the counter steering mode. Thus, in a case in which the previous steering mode was the normal mode, the CPU 31 changes the steering mode to the counter steering mode. The CPU 31 also provides notification that the steering mode is set to the counter steering mode. This notification is provided by, for example, displaying a message on the display unit 9 or using an audio or voice output.

Then, in step S104, the CPU 31 obtains behavior information on the hull 13. The behavior information includes information (behaviors of the hull 13) relating a shift of the hull 13 in one or more of the roll direction, the yaw direction, and the crosswise direction. In the present preferred embodiment, the CPU 31 obtains all the behaviors as the behavior information. The CPU 31 further obtains a speed and an acceleration of the hull 13 in each of the directions as the information or behaviors relating to shifts of the hull 13 in the directions. As the information or behaviors relating to shifts of the hull 13 in the roll direction and the yaw direction, the CPU 31 further obtains differences of the yaw angle and the roll angle from respective target values. In addition, the CPU 31 obtains the steering load and the helm operation load discussed above and their amounts of change per unit time as the behavior information. How these elements of the behavior information are used will be described below with reference to step S108.

In step S105, the CPU 31 judges whether or not the behavior of the hull 13 has become excessive. To make this judgment, a first threshold value and a second threshold value are provided for each of the elements of the behavior information such as shifts in the roll direction, yaw direction, and crosswise direction of the hull 13, the steering load, and the helm operation load. The second threshold value is greater than the first threshold value. The first threshold value is a judgment threshold value to judge whether or not to perform counter steering. When at least one of the elements has become greater than the corresponding first threshold value, counter steering is performed (described below with reference to steps S106 to S108). On the other hand, the second threshold value is a judgment threshold value to judge whether or not to perform forced deceleration on the hull 13. When at least one of the elements has become greater than the corresponding second threshold value, the CPU 31 judges that the behavior of the hull 13 has become excessive, and performs forced deceleration on the hull 13 (described below with reference to steps S110). Forced deceleration forcefully decreases the speed of the hull 13. The reason for performing forced deceleration is that when the behavior of the hull 13 has become excessive, it is determined that excessive chine walk has occurred and hence it cannot be controlled by counter steering.

As a result of the judgment in the step S105, when it is judged that the behavior of the hull 13 has become excessive, the process proceeds to the step S110, and the CPU 31 in turn forcefully decreases the speed of the hull 13 and also provides notification that forced deceleration is performed because the behavior of the hull 13 has become excessive. As the forced deceleration, the CPU 31 closes the throttle valve (or decreases the throttle opening) of the engine 16 by a predetermined amount. At this time, the throttle valve may be fully closed. Alternatively, as the forced deceleration, the CPU 31 may control the trim tab actuators 22A and 22B to lower both of the tab 21A and the tab 21B by a predetermined amount. At this time, both of the tab 21A and the tab 21B may be lowered to the lowermost position. It should be noted that decreasing the throttle opening and lowering the tabs 21A and 21B may be done in combination for the forced deceleration. After the CPU 31 completes the step S110, the process returns to the step S101.

As a result of the judgment in the step S105, when it is judged that the behavior of the hull 13 has not become excessive, the process proceeds to step S106, and the CPU 31 in turn judges whether or not it is necessary to perform counter steering. As described above, the CPU 31 judges that it is necessary to perform counter steering when at least one of the elements of the behavior information such as shifts of the hull 13 in the roll direction and other directions has become greater than the corresponding first threshold value. When the CPU 31 judges that it is not necessary to perform counter steering, the process returns to the step S101. Thus, counter steering is not performed when changes in the behavior are small, and excessive steering control is avoided. Judging that it is necessary to perform counter steering can be considered substantially synonymous with judging that chine walk has substantially occurred. It should be noted that it is not absolutely necessary to execute the steps S105, S106, and S110 (to make judgements using the first and second threshold values).

When the CPU 31 judges in the step S106 that it is necessary to perform counter steering, the process proceeds to step S107, and the CPU 31 in turn calculates correction values. In step S108, the CPU 31 performs counter steering based on the correction values calculated in the step S107, and in the case in which the CPU 31 has performed counter steering, it provides notification thereof continuously for a predetermined period of time. It should be noted that the period of time during which the notification is continued may be a period of time during which counter steering is performed. After the CPU 31 completes the step S108, the process returns to the step S101. A description will now be given of how the correction values are calculated and counter steering is performed in the steps S107 and S108.

When the CPU 31 judges that it is necessary to perform counter steering, it controls steering of the marine vessel 11 by performing counter steering so as to reduce at least some of one or more of the behaviors of the hull 13 based on the obtained behavior information. For example, counter steering includes an operation to change the orientation of the propeller shaft 29. Counter steering also includes an operation to change the angle of at least one of the tabs 21A and 21B. It should be noted that the CPU 31 may perform counter steering by changing the orientation of the propeller shaft 29 and/or changing the angles of the tabs 21A and 21B. A description will now be given of how the orientation of the propeller shaft 29 is changed so as to control counter steering.

The CPU 31 calculates a total counter-steering acceleration BB and a total counter-steering target amount AA as described below. The CPU 31 changes the orientation of the propeller shaft 29 about the turning center C4 by a target amount, which is represented by the total counter-steering target amount AA, to an orientation that will reduce the behaviors of the hull 13. In mathematical expressions below, Ay, Ar, and As represent correction values for the target amount to control the posture of the hull 13 in directions opposite to shifts of the hull 13 in the yaw, roll, and crosswise directions (hereinafter, referred to as correction values for the counter-steering target amount). Also, By, Br, and Bs represent correction values for the acceleration to control the posture of the hull 13 in directions opposite to shifts of the hull 13 in the yaw, roll, and crosswise directions (hereinafter, referred to as correction values for the counter-steering acceleration). Au and Bu represent correction values for the counter-steering target amount and the counter-steering acceleration, both relating to the steering load and the helm operation load. It should be noted that y1 to y6, r1 to r6, s1 to s4, u1 to u8, ky1, kr1, ks1, ku1, ky2, kr2, Ks2, and ku2 are coefficients.

As the correction values relating to the yaw direction, the CPU 31 calculates the correction value Ay for the counter-steering target amount and the correction value By for the counter-steering acceleration from the expressions (1) and (2), respectively. It should be noted that a yaw angle in the expressions is a difference between a target yaw angle and an actual yaw angle. The target yaw angle is a center of an amplitude of the actual yaw angle.

$$Ay = \text{yaw angle} \times y1 + \text{yaw rate} \times y2 + \text{yaw acceleration} \times y3 \quad (1)$$

$$By = \text{yaw angle} \times y4 + \text{yaw rate} \times y5 + \text{yaw acceleration} \times y6 \quad (2)$$

As the correction values relating to the roll direction, the CPU 31 calculates the correction value Ar for the counter-steering target amount and the correction value Br for the counter-steering acceleration, from the expressions (3) and (4), respectively. It should be noted that a roll angle in the expressions is a difference between a target roll angle and an actual roll angle. The target roll angle is a center of an amplitude of the actual roll angle.

$$Ar = \text{roll angle} \times r1 + \text{roll speed} \times r2 + \text{roll acceleration} \times r3 \quad (3)$$

$$Br = \text{roll angle} \times r4 + \text{roll speed} \times r5 + \text{roll acceleration} \times r6 \quad (4)$$

As the correction values relating to the shift in the crosswise direction of the hull 13, the CPU 31 calculates the correction value As for the counter-steering target amount and the correction value Bs for the counter-steering acceleration from the expressions (5) and (6), respectively.

$$As = \text{shift speed} \times s1 + \text{shift acceleration} \times s2 \quad (5)$$

$$Bs = \text{shift speed} \times s3 + \text{shift acceleration} \times s4 \quad (6)$$

As the correction values relating to a helm and steering, the CPU 31 calculates the correction value Au for the counter-steering target amount and the correction value Bu for the counter-steering acceleration from the expressions (7) and (8), respectively.

$$Au = [\text{steering load} \times u1 + \text{the amount of change in steering load} \times u2] + [\text{helm operation load} \times u3 + \text{the amount of change in helm operation load} \times u4] \quad (7)$$

$$Bu = [\text{steering load} \times u5 + \text{the amount of change in steering load} \times u6] + [\text{helm operation load} \times u7 + \text{the amount of change in helm operation load} \times u8] \quad (8)$$

Then, the CPU 31 calculates the total counter-steering target amount AA and the total counter-steering acceleration BB from the expressions (9) and (10), respectively.

$$AA = (Ay \times ky1) + (Ar \times kr1) + (As \times ks1) + (Au \times ku1) \quad (9)$$

$$BB = (By \times ky2) + (Br \times kr2) + (Bs \times ks2) + (Bu \times ku2) \quad (10)$$

It should be noted that the correction values may be weighted. To weight the correction values, the values ky1, kr1, ks1, ku1, ky2, kr2, ks2, and ku2 may be set to respective desired values. Moreover, it is not absolutely necessary to completely correct the behaviors (such as shifts) of the hull 13, but the behaviors of the hull 13 may be corrected partially. Thus, in the expression (9), the coefficients other than at least one of the coefficients ky1, kr1, ks1, and ku1 may be set to zero. Likewise, in the expression (10), the coefficients other than at least one of the coefficients ky2, kr2, ks2, and ku2 may be set to zero.

As described above, when performing counter steering in the counter steering mode, the CPU 31 controls the amount by which the orientation of the propeller shaft 29 is changed (the total counter-steering target amount AA) and the acceleration at which the orientation of the propeller shaft 29 is changed (the total counter-steering acceleration BB) based on the behavior information.

It should be noted that in a case in which the angles of the tabs 21A and 21B are changed during controlling counter steering, the CPU 31 may use only the total counter-steering target amount AA without using the total counter-steering acceleration BB. In this case, the CPU 31 lowers an appropriate one of the tabs 21A and 21B by an angle corresponding to the total counter-steering target amount AA, in such a direction as to reduce the shifts of the hull 13. In other words, in the counter steering mode, the CPU 31 determines one of the tabs 21A and 21B to be actuated based on the obtained behavior information, and controls a corresponding one of the trim tab actuators 22A and 22B so as to change a position of the determined tab. For example, the CPU 31 lowers one of the tabs 21A and 21B which is on the side opposite to the yaw direction. Moreover, the CPU 31 may calculate the total counter-steering target amount AA from the following expression (11) instead of the expression (9).

$$AA = (Ay \times ky1) - (Ar \times kr1) \quad (11)$$

It should be noted that the second term in the expression (11) is opposite in sign to the one in the expression (9). This is because moving the tab in such a direction as to correct for yawing will have an adverse effect from the viewpoint of reducing the displacement in the roll direction.

According to the present preferred embodiment, when judging that the mode changing conditions are satisfied, the CPU 31 changes the steering mode to the counter steering mode, and based on the obtained behavior information, the CPU 31 controls steering of the marine vessel 11 by performing counter steering so as to reduce at least some of one or more of the behaviors of the hull 13. According to the steering control, chine walk is automatically reduced even if the vessel operator is not an advanced level operator.

Moreover, since the CPU 31 forcefully decreases the speed of the hull 13 when judging that one or more of the behaviors of the hull 13 becomes excessive, it quickly reduces the behaviors that cannot be dealt with by counter steering.

The CPU 31 obtains the behavior information including one or more of the information elements relating to shifts of the hull in the roll direction, the yaw direction, and the crosswise direction; the steering load; and the helm operation load. The CPU 31 performs the counter steering so as to reduce at least some of one or more of the behaviors indicating the above-described information elements. It allows the steering control apparatus to deal with complex changes in behavior of the hull 13 and properly reduce chine walk. It should be noted that the CPU 31 may obtain and use one or more of the behavior of the hull 13 in the roll direction, the behavior in the yaw direction, the behavior in the crosswise direction, the steering load, and the helm operation load, as the behavior information.

It should be noted that counter steering may include changing an operation position of a helm (the steering wheel 18), which is operated by a vessel operator to control the direction that the hull 13 moves in, in addition to changing the orientation of the propeller shaft 29 and/or changing the angles of the tabs 21A and 21B. Alternatively, the CPU 31 performs the counter steering by changing an operation position of the helm without changing the orientation of the propeller shaft 29 or changing the angles of the tabs 21A and 21B. The helm for use in these cases is not limited to the steering wheel 18 but may be, for example, a joystick.

It should be noted that as the posture control tabs, interceptor tabs may be used in place of the tabs 21A and 21B. In this case, each of the interceptor tabs changes its position in the water from a position at which it projects from a bottom surface (the vessel bottom) of the hull 13 to a position which is above the bottom surface of the hull 13. The CPU 31 lowers the interceptor tabs instead of lowering the tabs. Alternatively, the CPU 31 may change the positions of both the tabs 21A and 21B and the interceptor tabs.

It should be noted that two or more outboard motors 15 may be mounted on the hull 13. Marine vessels to which preferred embodiments of the present invention are applicable are not limited to those equipped with one or more outboard motors, but the present invention is also applicable to marine vessels equipped with other types of marine propulsion devices such as inboard/outboard motors (stern drive, inboard motor/outboard drive).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steering control apparatus for a marine vessel, the steering control apparatus comprising:
    a processor configured or programmed to:
        obtain behavior information on a hull including one or more of a behavior relating to a shift of the hull in a roll direction, a shift of the hull in a yaw direction, a shift of the hull in a crosswise direction, a steering load, and a helm operation load;
        judge whether or not one or more conditions to change a steering mode to a counter steering mode in which counter steering is performed are satisfied; and
        change the steering mode to the counter steering mode upon judging that the one or more conditions are satisfied; wherein
    in the counter steering mode, the processor is configured or programmed to control steering of the marine vessel by performing counter steering so as to reduce at least some of one or more of the behaviors of the hull based on the obtained behavior information.

2. The steering control apparatus according to claim 1, wherein the one or more conditions includes a condition that a speed of the hull becomes equal to or greater than a predetermined speed.

3. The steering control apparatus according to claim 1, wherein the one or more conditions includes a condition that a speed of the hull becomes equal to or greater than a predetermined speed while the hull is moving straight.

4. The steering control apparatus according to claim 2, wherein the predetermined speed is greater than a speed at which the hull switches from a non-planing state to a planing state.

5. The steering control apparatus according to claim 3, wherein the predetermined speed is greater than a speed at which the hull switches from a non-planing state to a planing state.

6. The steering control apparatus according to claim 1, wherein the marine vessel includes a propulsion device equipped with a propeller and a propeller shaft, and the counter steering includes changing an orientation of the propeller shaft.

7. The steering control apparatus according to claim 6, wherein, in the counter steering mode, the processor is configured or programmed to control an amount by which the orientation of the propeller shaft is changed based on the obtained behavior information.

8. The steering control apparatus according to claim 7, wherein, in the counter steering mode, the processor is configured or programmed to control an acceleration at which the orientation of the propeller shaft is changed based on the obtained behavior information.

9. The steering control apparatus according to claim 1, further comprising:
    a port side posture control tab and a starboard side posture control tab mounted, respectively, on a port side and a starboard side at a stern of the hull to control a posture of the hull by changing positions of the port side posture control tab and the starboard side posture control tab in a vertical direction; and
    a port side actuator and a starboard side actuator that actuate the port side posture control tab and the starboard side posture control tab, respectively; wherein
    the counter steering includes controlling the port side actuator and/or the starboard side actuator.

10. The steering control apparatus according to claim 9, wherein, in the counter steering mode, the processor is configured or programmed to determine a posture control tab to be actuated among the port side posture control tab and the starboard side posture control tab based on the obtained behavior information, and control the corresponding one of the port side actuator and the starboard side actuator to change a position of the determined posture control tab to be actuated.

11. The steering control apparatus according to claim 1, wherein, in the counter steering mode, the processor is configured or programmed to perform the counter steering on the condition that the processor judges, based on the obtained behavior information, that at least one of the behaviors of the hull has exceeded a first threshold value.

12. The steering control apparatus according to claim 11, wherein, in the counter steering mode, the processor is configured or programmed to decrease the speed of the hull upon judging that the at least one of the behaviors of the hull has exceeded a second threshold value greater than the first threshold value.

13. The steering control apparatus according to claim 12, wherein the processor is configured or programmed to decrease the speed of the hull by one or more of:
    decreasing a throttle opening of a propulsion device by a predetermined amount, the propulsion device including an engine to generate a propulsive force to move the hull; and
    lowering posture control tabs mounted on a port side and a starboard side at a stern of the hull by a predetermined amount.

14. The steering control apparatus according to claim 12, wherein, in a case in which the processor has decreased the speed of the hull, the controller provides notification thereof.

15. The steering control apparatus according to claim 1, wherein, in a case in which the processor has changed the steering mode to the counter steering mode, the controller provides notification thereof.

16. The steering control apparatus according to claim 1, wherein, in the counter steering mode, in a case in which the counter steering has been performed, the controller provides notification thereof.

17. The steering control apparatus according to claim 1, wherein the counter steering includes changing an operation position of a helm that is operated to control a moving direction of the hull.

18. A steering control method for a marine vessel, the method comprising:
- obtaining, via a processor, behavior information on a hull including one or more of a behavior relating to a shift of the hull in a roll direction, a shift of the hull in a yaw direction, a shift of the hull in a crosswise direction, a steering load, and a helm operation load;
- judging, via the processor, whether or not one or more conditions to change a steering mode to a counter steering mode in which counter steering is performed are satisfied;
- changing, via the processor, the steering mode to the counter steering mode upon judging that the one or more conditions are satisfied; and
- in the counter steering mode, controlling, via the processor, steering of the marine vessel by performing the counter steering so as to reduce at least some of one or more of the behaviors of the hull based on the obtained behavior information.

19. A marine vessel comprising:
- a hull; and
- a steering control apparatus including a processor configured or programmed to:
  - obtain behavior information on a hull including one or more of a behavior relating to a shift of the hull in a roll direction, a shift of the hull in a yaw direction, a shift of the hull in a crosswise direction, a steering load, and a helm operation load;
  - judge whether or not one or more conditions to change a steering mode to a counter steering mode in which counter steering is performed are satisfied; and
  - change the steering mode to the counter steering mode upon judging that the one or more conditions are satisfied; wherein
- in the counter steering mode, the processor is configured or programmed to control steering of the marine vessel by performing the counter steering so as to reduce at least some of one or more of the behaviors of the hull based on the obtained behavior information.

* * * * *